United States Patent [19]
Durand

[11] Patent Number: 5,411,435
[45] Date of Patent: May 2, 1995

[54] MACHINE AND PROCESS FOR APPLYING SANITARY STAMPS ON AN ANIMAL

[75] Inventor: Lucien Durand, Lyas, France

[73] Assignee: Durand International, Chomerac, France

[21] Appl. No.: 141,508

[22] Filed: Oct. 27, 1993

[30] Foreign Application Priority Data

Oct. 27, 1992 [FR] France .................. 92 13127

[51] Int. Cl.⁶ ............................................ A22C 17/10
[52] U.S. Cl. ............................................ 452/198
[58] Field of Search .................. 452/148, 198, 160

[56] References Cited

U.S. PATENT DOCUMENTS

| | | | |
|---|---|---|---|
| 4,034,668 | 7/1977 | Picknick et al. | 452/198 |
| 4,597,495 | 7/1986 | Knosby | 452/198 |
| 5,139,457 | 8/1992 | Rankin et al. | 452/160 |

FOREIGN PATENT DOCUMENTS

| | | |
|---|---|---|
| 0273371 | 7/1988 | European Pat. Off. . |
| 2523813 | 9/1983 | France . |
| 2545010 | 11/1984 | France . |
| 2546423 | 11/1984 | France . |
| 2620596 | 3/1989 | France . |

*Primary Examiner*—Willis Little
*Attorney, Agent, or Firm*—Bacon & Thomas

[57] ABSTRACT

A machine designed to apply pads on the skin of a slaughtered animal suspended from a conveyor includes a frame comprising a bearing structure supporting a gripping and ramming chassis adapted to be displaced by a drive member, in a substantially horizontal direction to extend outside the plane of extension of the bearing structure, the chassis comprising:

- a bearing and centering structure developing substantially in a vertical plane along the major part of the length of the animal and intended to be engaged between two half-carcasses of the animal,
- at least one pair of presser arms whose relative approach and moving apart with respect to the bearing and centering structure are controlled, and intended to come into contact with the half carcasses of the animal in order to ensure, in combination with the structure, immobilization of the animal,
- and at least one pair of rammer arms.

12 Claims, 6 Drawing Sheets

MACHINE AND PROCESS FOR APPLYING SANITARY STAMPS ON AN ANIMAL

FIELD OF THE INVENTION

The present invention relates to the domain of industrial slaughtering of animals, in the general sense, and concerns in particular the slaughter of hogs.

The object of the invention concerns, more particularly, the phase following those of slaughter and evisceration, during which a veterinary inspection is made to determine whether or not the animal is fit for consumption.

BACKGROUND OF THE INVENTION

It should be recalled that, by law, every slaughtered animal must be subjected to sanitary inspection. The veterinary surgeon having carried out such examination applies on the animals, based on health rules, an official stamp on different parts of each animal which are explicitly designated by legislation. In the domain of sanitary inspection of slaughtered hogs, the present law provides placing on every half-carcass of a hog, five sanitary stamps, viz. on the cheek, shoulder, ribs, loin and ham.

It is known in the prior art to apply sanitary stamps via a manually manoeuvred pad. It is clear that it is a delicate, unpleasant and fastidious operation to place sanitary stamps on slaughtered animals. Moreover, the execution of this operation presents a duration which becomes more and more incompatible with the speed of the industrial slaughtering chains. Furthermore, the duration of this operation tends to increase, insofar as the legislation aims at increasing the number of sanitary stamps having to be placed on the slaughtered animals.

There is therefore a need to have means available for rendering automatic the operation of application of the official stamps on the slaughtered animals, whilst conserving the vet's autorization for each animal.

In an attempt to satisfy this need, various technical solutions have been proposed. For example, Patent Application FR-A-2 523 813 describes a marking apparatus adapted to place stamps on carcasses of slaughtered animals suspended from a conveyor. The apparatus comprises a guide ramp extending parallel to the direction of advance of the carcasses to allow the latter to abut on the ramp, during the marking operation. A presence detector is mounted on the guide ramp so as to allow control of pivoting of two arms, each equipped with a marking pad.

Such an apparatus does not give satisfaction in practice. In fact, the animal is not held efficiently during marking, which is detrimental to the efficiency of the marking operation. Furthermore, the rubbing of the animal on the guide ramp leads to a jerky advance of the animal, affecting the correct placing of the pads. Moreover, such an apparatus is not adapted to ensure application of a series of stamps on each half-carcass of the animal.

Patent Application EP 0 273 371 also proposes an installation providing various examinations and treatments on the slaughtered animals and, in particular, allowing the application of pads. This installation comprises a series of mobile carriages moving on a closed circuit and intended to carry the slaughtered animals during their passage in front of different examination stations and, in particular, a branding station. The branding station is composed of a series of articulated arms mounted on a fixed column and each provided with a pad. Pivoting of the arms is controlled when the carriage supporting the animal passes in front of the branding station.

The installation described by this document is manifestly very complex to operate and its manufacturing costs are prohibitive. Moreover, it proves particularly delicate to obtain an efficient branding, due to the very principle of this installation which consists in applying stationary pads on an advancing slaughtered animal.

It is therefore an object of the present invention to overcome the drawbacks of the prior art techniques, by proposing a machine designed to ensure correct application of the pads on various parts of the skin of a slaughtered animal and to be integrated in an industrial slaughtering chain without making any modification thereto.

Another object of the invention aims at proposing a machine allowing application of the pads on the various parts of the animal imposed by law, whatever the size of the animal.

Another object is to propose a machine capable of adapting itself to the configuration of hooking of the slaughtered animal suspended from the conveyor.

SUMMARY OF THE INVENTION

To attain these various objects, the machine according to the invention is in the form of a frame intended to be placed laterally with respect to the direction of advance of the conveyor and equipped with a means for holding the animal and with at least one pair of arms each equipped with at least one pad, whose relative movement towards and away from each other is controlled.

According to the invention, the frame comprises a bearing structure supporting a gripping and ramming chassis adapted to be displaced by a drive member in a substantially horizontal direction to extend outside the plane of extension of the bearing structure, the chassis comprising:

- a bearing and centering structure developing substantially in a vertical plane along the major part of the length of the animal and intended to be engaged between the two half-carcasses of the animal,
- at least one pair of presser arms adapted to be moved towards and away from each other with respect to the bearing and centering structure and intended to come into contact with the half-carcasses of the animal, in order to ensure, in combination with the structure, immobilization of the animal,
- and at least one pair of ramming arms.

The object of the invention also aims at proposing a process for application of the sanitary stamps, consisting in:

- placing the machine laterally with respect to the direction of displacement of the conveyor,
- detecting the presence of a slaughtered animal suspended from the conveyor, at a given distance from the machine,
- displacing the gripping and ramming chassis transversely and in the direction of the conveyor so that at least one bearing system comes into contact with one of the sides of the animal,
- controlling the approach of at least one presser arm with respect to the bearing system in order to come into contact with the other side of the animal so as to immobilize the latter, controlling relative approach of at least one rammer arm with respect to the bearing system or of the presser arm, in order to ensure application of the pad on the animal's skin, controlling relative moving apart of the rammer arm and the presser arm with respect to the bearing system, and disengaging the gripping and ramming chassis with respect to the conveyor.

BRIEF DESCRIPTION OF THE DRAWINGS

The invention will be more readily understood on reading the following description with reference to the accompanying drawings, in which.

DETAILED DESCRIPTION OF THE DRAWINGS

Figure 1:
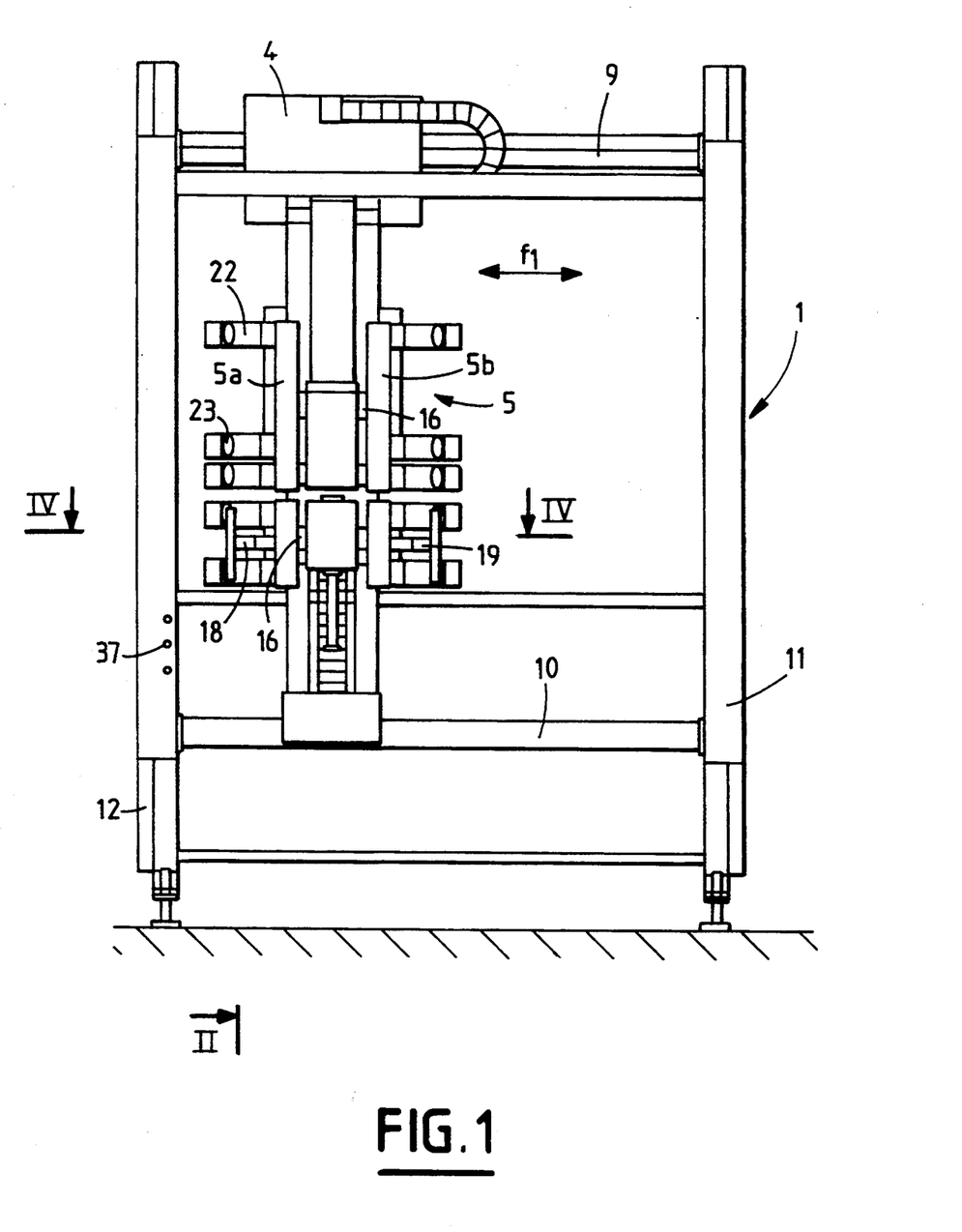
FIG. 1 is a view in front elevation of an embodiment of a machine according to the invention.
Figure 2:
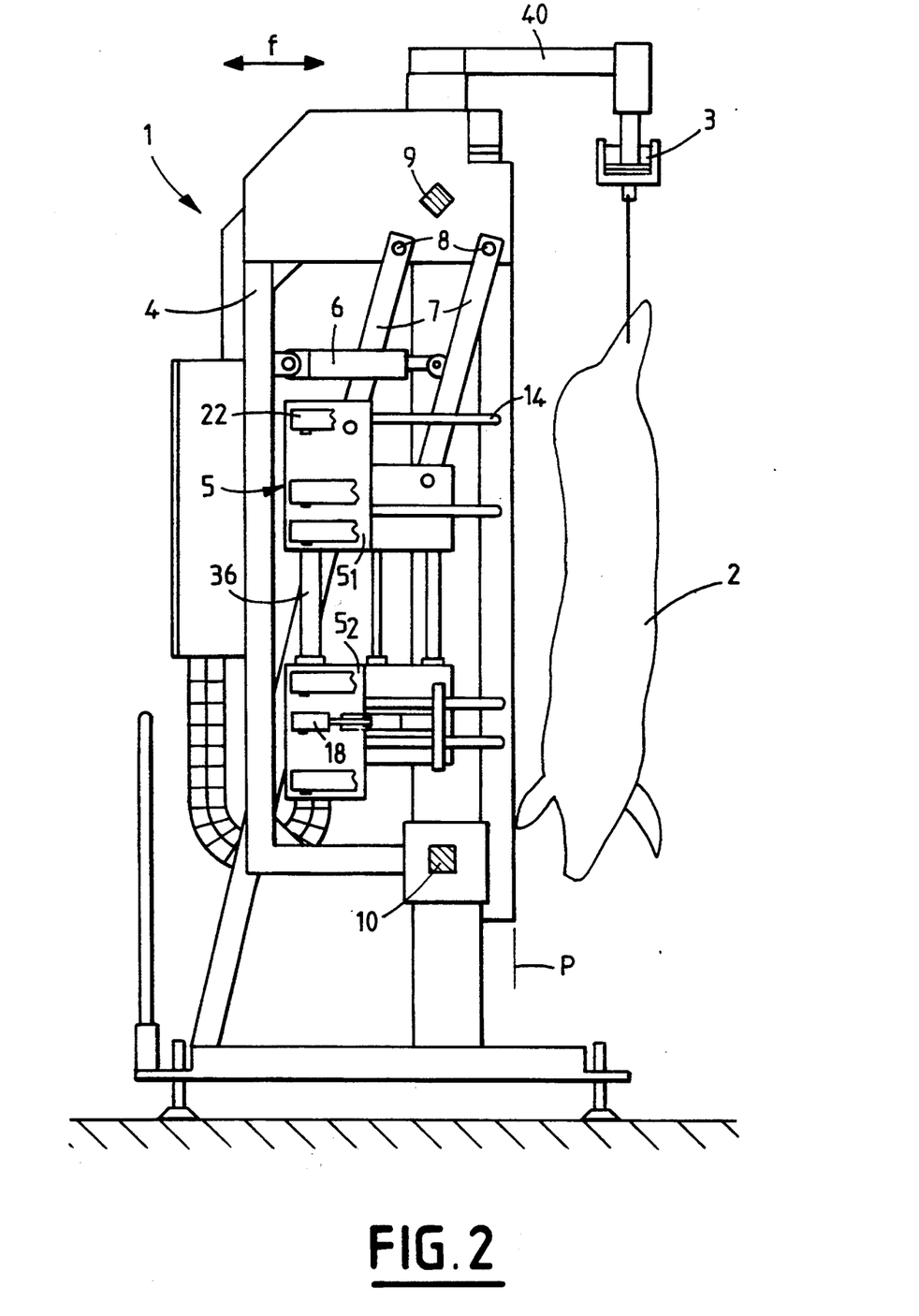
FIG. 2 is a transverse section taken substantially along lines II—II of FIG. 1 and illustrating the machine in a rest position.
Figure 3:
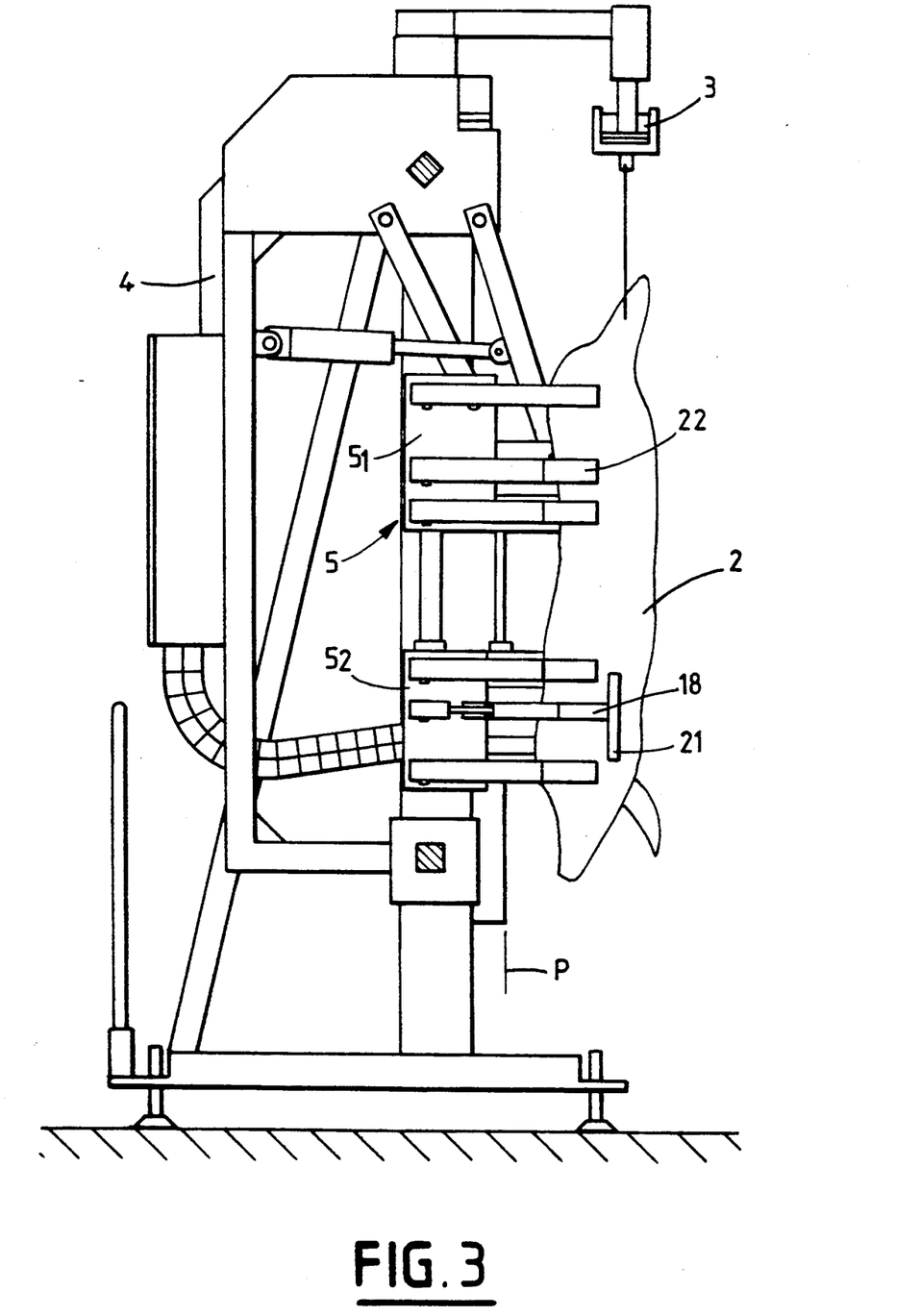
FIG. 3 is a transverse section taken substantially along lines II—II of FIG. 1 and illustrating the machine in a operating position.

Referring now to the drawings, and firstly to FIGS. 1 to 3, the machine 1 according to the invention is intended to ensure application of stamps, for example sanitary stamps, on the skin of slaughtered animals 2, such as hogs which, after slaughter proper, are suspended by their rear legs from a conveyor 3 preferably causing them to advance continuously in front of various intervention stations. In the following specification, each suspended animal 2 is in the form of two half carcasses $2_1$ and $2_2$ (see FIGS. 4A–4D) extending either substantially parallel to each other, if they are completely separated, or forming a V, if the carcasses are joined together at a low point.

Machine 1 comprises a bearing structure 4 supporting a gripping and ramming chassis 5 adapted to be displaced by an appropriate drive member 6, in the direction of arrows f, between retracted and extended positions, respectively illustrated in FIGS. 2 and 3. The drive member 6 is intended to displace the chassis 5 in a substantially horizontal direction so that the chassis 3 may extend outside the plane of extension P of the bearing structure 4. The drive member 6 may be constituted by a jack imposing a purely linear horizontal displacement on the chassis 5 in that case mounted on slideways presented by the structure 4 in the corresponding direction. As is more precisely shown in FIGS. 2 and 3, the connection between chassis 5 and structure 4 may be provided so that the horizontal displacement in the direction of arrows f is of the pendular type. In such a case, chassis 5 is suspended from a deformable parallelogram formed by two connecting rods 7 articulated on pins 8 borne by structure 4.

In the example illustrated, the bearing structure 4 is mounted to move in translation in a direction $f_1$ substantially perpendicular to the direction f of displacement of the chassis 5. To that end, the structure 4 is guided in displacement on upper (9) and lower (10) slideways borne by uprights 11. As is more precisely visible in FIG. 1, uprights 11 are mounted on a frame 12, so as to be vertically adjustable by any appropriate means. Such a possibility of adjustment makes it possible to adapt the position of structure 4 and consequently of chassis 5, to the position occupied by the suspended animal 2 which depends on the nature of its system of hooking.

Figure 4A:
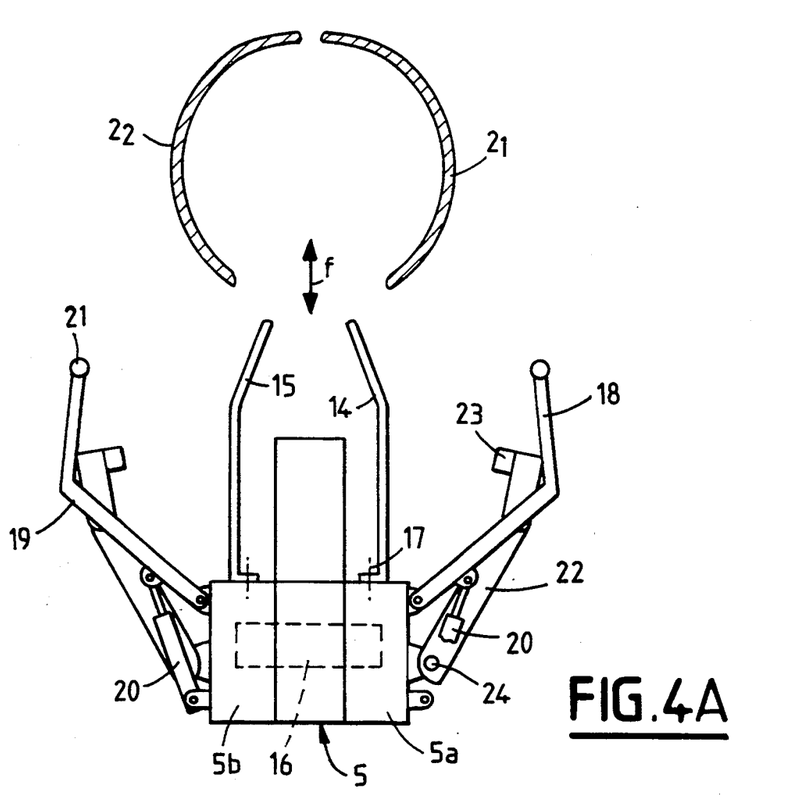
FIG. 4A is a horizontal transverse section taken substantially along lines IV—IV of FIG. 1 and illustrating the machine in a first phase of operation.

Chassis 5 comprises a bearing and centering structure formed, in the example illustrated, by two bearing systems 14 and 15 each developing substantially in a vertical plane. Each bearing system 14, 15 is formed, for example, by a series of superposed rods, distributed over a height at the most equal to, and in general less than the size of the animal 2. In the example illustrated, each bearing system 14, 15 is formed by four rods presenting, from one system to the other, an identical distribution adapted to allow an abutment of the animal at least at the level of its end regions. Advantageously, the systems 14 and 15 together form a bearing and centering structure intended to be engaged between the two half-carcasses $2_1$ and $2_2$ of the animal (FIG. 4A). In order to facilitate insertion thereof between the two half-carcasses, each rod 14 and 15 preferably presents a rectilinear segment parallel to direction f, extended by a curved segment in the direction of the rod of the other bearing system, placed at the same level. Each system 14 and 15 thus constitutes a bearing plane which may be formed by a continuous structure, such as a cheek or, as illustrated in the drawings, by a discontinuous structure formed by superposed rods.

According to an advantageous feature, the relative distance between the bearing systems 14 and 15 is adjustable in order to be adapted to the distance and relative inclination of the two half-carcasses $2_1$, $2_2$. To that end, the rods of each bearing system 14 and 15 are respectively fixed on two superposed support blocks 5a, 5b arranged on either side of the chassis 5 and mounted on crosspieces 16 via temporary assembly means (not shown).

Chassis 5 also comprises at least two presser or gripper arms 18, 19 mounted symmetrically on the support blocks 5a, 5b of chassis 5, extending in superposition, on either side of the bearing systems 14 and 15 (FIG. 4A). Relative approach and moving apart with respect to the respective bearing systems 14 and 15 of each presser arm 18, is controlled via an appropriate drive member 20. Each presser arm 18, 19 is formed by a lever provided, in its terminal part, with a vertical cylinder 21 intended to act on opposite outer parts of the half-carcasses. Arms 18, 19 preferably grip the animal in its lower end region. The presser arms 18, 19 and the bearing systems 14, 15 thus form an efficient means for immobilizing an animal with respect to the chassis 5.

Chassis 5 is also equipped with at least one and, in the example illustrated, with two series of five rammer arms 22 each provided with at least one pad 23. Relative approach and moving away of each rammer arm 22 with respect to the bearing systems 14, 15 or to the presser arms 18, 19, is controlled by a drive member (not shown), such as a rotating jack. The arms 22 of each series are mounted symmetrically on the support blocks 5a, 5b. Each arm 22 is mounted on a pin 24 whose inclination with respect to the vertical may be regulated, with a view to adjusting the spatial position occupied by the pad.

Figure 5:
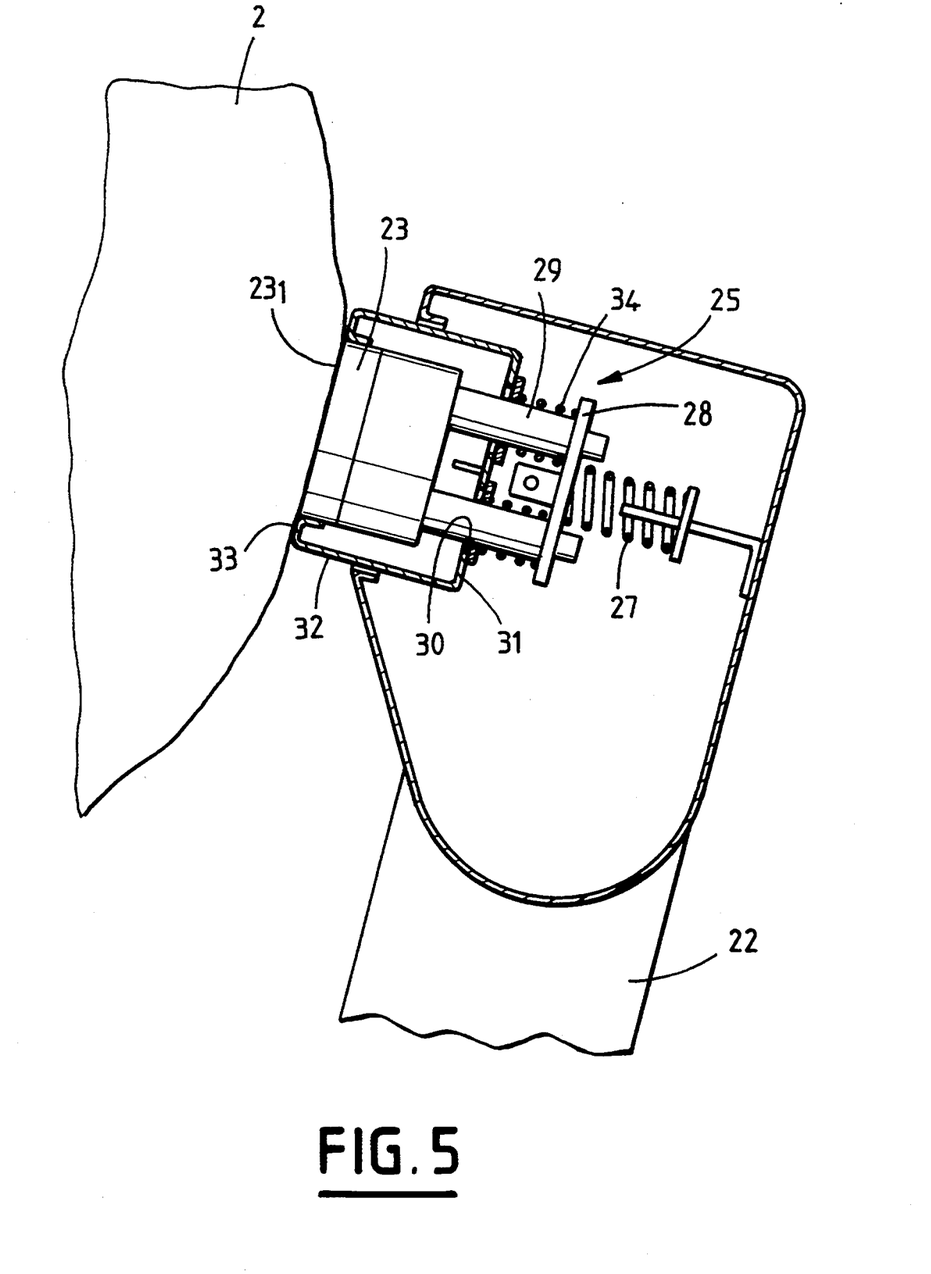
FIG. 5 is a view in section of a characteristic detail of the machine according to the invention relative to the assembly of a pad for applying sanitary stamps.

According to a feature of the invention, illustrated more precisely in FIG. 5, each pad 23 is mounted on an arm 22 by omnidirectional hold means 25 ensuring correct application of the pad 23 on the skin of the animal, whatever its local conformation presented with respect to the movement of the rammer arm. In the example illustrated, the hold means 25 are constituted via a spring 27 acting on a plate 28 mounted fast with the pad 23 with the aid of connecting rods 29. Advantageously, the connecting rods 29 traverse passages 30 made in a wall 31 of the presser arm 22 and presenting a section greater than the local section of the rods, so as to allow an omnidirectional angular clearance of the pad with respect to the presser arm 22. The presser arm 22 is preferably provided with a protecting sleeve 32 defining an annular bearing and centering surface 33 of the pad. The emergence of the pad 23 with respect to the sleeve 32 is ensured via return springs 34 interposed between the wall 31 of the presser arm and the connecting plate 28. In order to obtain application of all the design of the pad, such as a sanitary stamp, each pad 23 comprises a marking face $23_1$ in the form of a cap or dome of curved or segmented, continuous profile, thus presented in a hemi-spherical, pseudo hemi-spherical form, or of a stack of sections or washers of pyramidal section whose dimension decreases from the base to the apex. Each pad 23 advantageously comprises passages or vents opening out on the marking face $23_1$ and on the sides or rear face of the pad in order to ensure evacuation of the vapour created during branding.

According to a feature of the invention, the gripping and ramming chassis 5 is composed of a fixed upper part $5_1$ and of a vertically mobile lower part $5_2$. Each part $5_1$ and $5_2$ of the chassis comprises rammer arms 22 and a part of the bearing systems 14 and 15. The presser arms 18, 19 are preferably mounted on the mobile lower part $5_2$. The lower part $5_2$ of the chassis is guided in vertical displacement via guiding columns 36 fixed on the fixed part $5_1$. The mobile part $5_2$ is controlled in vertical displacement with the aid of a drive member (not shown) which is controlled from data on the size of the animal detected by an appropriate sensor 37. As shown in FIG. 1, the sensor 37 may be constituted by a series of superposed opto-electronic cells placed on one of the uprights of the frame 12. This sensor 37 is connected to a processing circuit which determines the position that the lower part $5_2$ of the chassis must take to ensure application of the pads 23 on the different regions of the animal provided by law. In the example illustrated, the mobile part $5_2$ of the chassis comprises two series of two rammer arms 22 ensuring application of the pads 23 on the cheek and shoulder, whilst the fixed part $5_1$ of the chassis allows two series of three stamps to be apposed on the ham, the loin and the ribs.

Functioning of the machine 1 according to the invention follows directly from the foregoing description.

Machine 1 according to the invention is intended to be placed laterally with respect to the direction of advance of the conveyor 3 which is considered as parallel to that of displacement $f_1$ of the structure 4. The plane of extension P of the structure 4 is placed at a distance close to the plane of displacement of the conveyor, whose measurement may be determined with the aid of a connecting spacer 40 fixed between the frame 12 and the conveyor 3. The machine 1 is installed on one of the sides of the conveyor, so as to be mounted facing the thoracic-abdominal opening of the suspended animals 2, in the case of the carcass of the animal being whole and on the lumbar or dorsal side if the carcass of the animal is split. The process according to the invention consists in effecting the operation of stamping of the various parts of the animal, preferably at a mobile station, as illustrated in the drawings, when the animal 2 is constantly advanced. After the detection of the presence of an animal, in relation with a given distance of the machine with the aid of a contactor placed on the path of the conveyor, and a detection of its size by the sensor 37, the lower part $5_2$ of the chassis is placed at a given level to ensure an application of the pads on the determined regions of the animal.

Figure 4B:
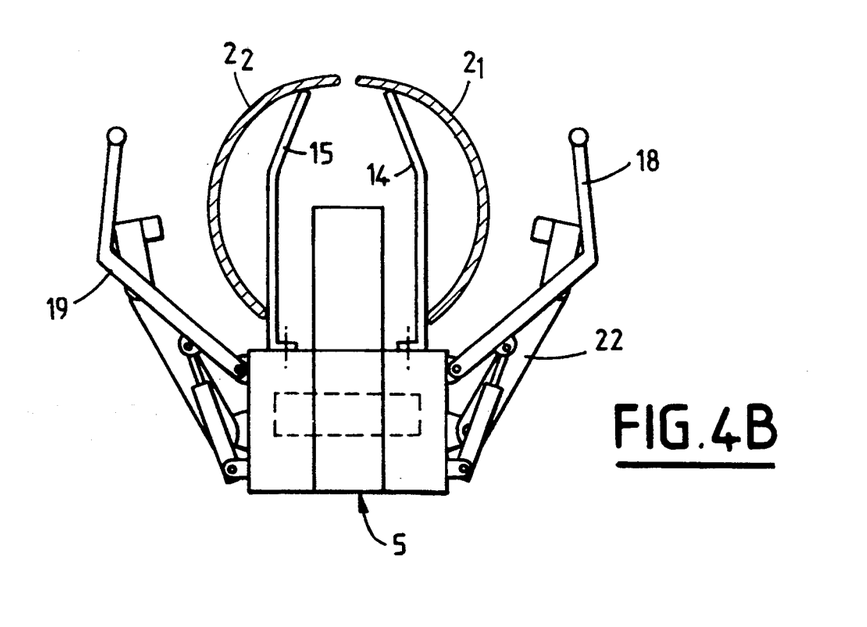
FIG. 4B is a horizontal transverse section taken substantially along lines IV—IV of FIG. 1 and illustrating the machine in a second phase of operation.
Figure 4C:
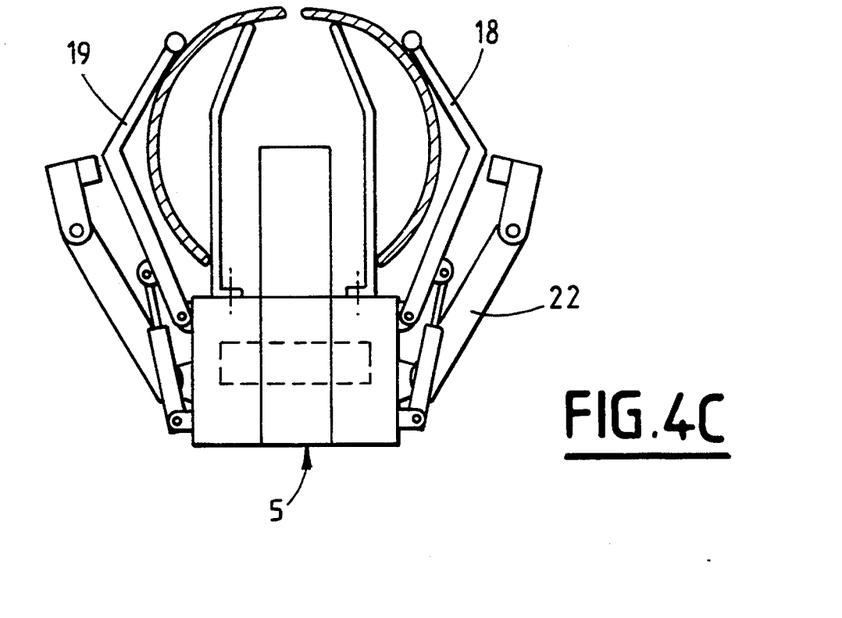
FIG. 4C is a horizontal transverse section taken substantially along lines IV—IV of FIG. 1 and illustrating the machine in a third phase of operation.

The bearing structure 4 is then controlled to undergo a concomitant translation at the same speed and in the same direction as the advance imposed on the animal 2 by the conveyor 3. The driving member 6 is then controlled to ensure displacement of the chassis 5 in the direction of the plane of advance of the conveyor 3, so that the bearing systems 14 and 15 extend outside the plane of extension P of the bearing structure and thus come into engagement between the two half-carcasses $2_1$, $2_2$ of the animal (FIG. 4B). Relative approach of the presser arms 18, 19 with respect to the bearing systems 14 and 15 is controlled, so that they come into contact with the animal, so as to obtain immobilization thereof by gripping. The animal is thus placed plumb in accordance with a fixed reference.

Figure 4D:
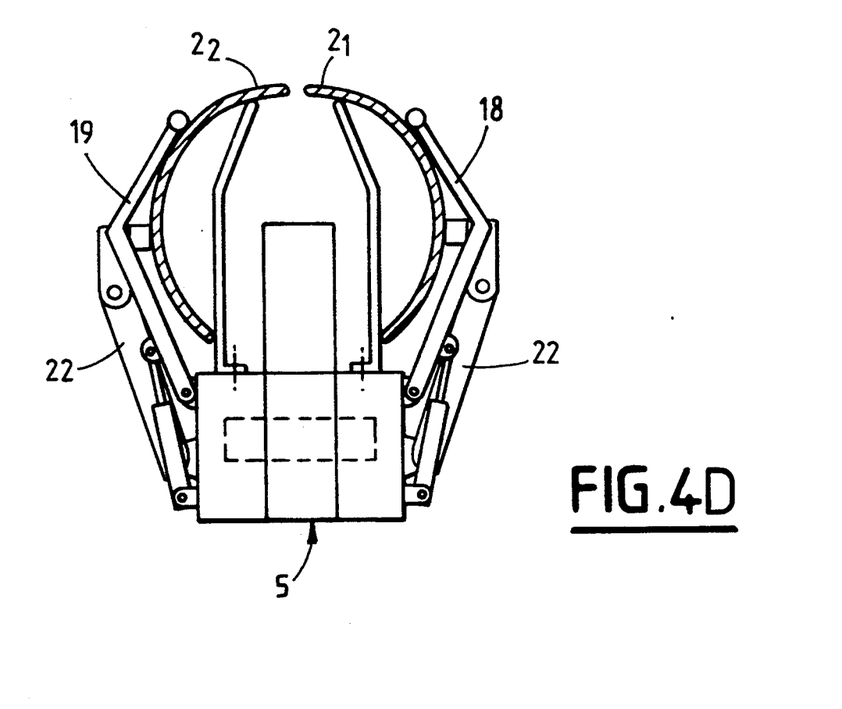
FIG. 4D is a horizontal transverse section taken substantially along lines IV—IV of FIG. 1 and illustrating the machine in a fourth phase of operation.

The rammer arms 22 are then preferably controlled simultaneously to come into abutment on the animal's skin and to apply the sanitary stamp on the localized regions required by law (FIG. 4D). The pads are maintained on the animal's skin, for a given duration, in the case of using heating pads. It should be noted that the time of application of the pads on the animal's skin does not constitute a critical operation, insofar as the pads are displaced at the same speed as the animal. The combined assembly of the rammer arms and the means for holding the animal in position, on the same chassis 5, makes it possible to ensure a correct application of the pads on the animal's skin and consequently a good print.

After application of the pads on the animal's skin, the pads, as well as the presser arms 18, 19, are moved apart relatively from one another. The bearing systems 14 and 15 may then be disengaged from the half-carcasses, upon control of the drive member 6 in the sense of moving apart of the rods with respect to the plane of advance of the conveyor. The bearing structure 4 is then displaced in a direction contrary to that of advance of the animals to return to its initial position, with a view to being ready to effect a fresh marking operation for an animal arriving in front of the machine.

The process according to the invention ensures application of the official stamps on the different parts of the animal imposed by legislation. Of course, the machine according to the invention is adapted to apply a different, even larger number of stamps in order to comply with the legal provisions in force. The various pads are placed during the process of conveying of the animals, without requiring modification to the slaughtering installation. Moreover, the animal is efficiently maintained in position over the whole of its length, when the pads are being applied, allowing a good application of the pads.

The invention is not limited to the examples described and shown, as various modifications may be made thereto without departing from its scope.

What is claimed is:

1. A machine for applying stamps on the skin of a slaughtered animal suspended from a conveyor comprising:
   a frame intended to be positioned laterally with respect to an advance direction of the conveyor, said frame including a bearing structure;
   a gripping and ramming chassis supported by said beating structure, said gripping and ramming chassis including a bearing and centering structure extending in a substantially vertical plane along a major part of the length of the animal, at least one pair of presser arms that are movable towards and away from each other and at least one pair of ramming arms each of which is equipped with a pad for marking the animal;
   first drive means for displacing, in a substantially horizontal direction, said gripping and ramming chassis to a position outside a plane of extension of said bearing structure wherein the bearing and centering structure is positioned between two carcass portions of the animal;
   second drive means for shifting said at least one pair of presser arms, relative to said bearing and centering structure, into engagement with said two carcass portions of the animal in order to ensure, in combination with said bearing and centering structure, immobilization of the animal; and
   third drive means for moving each of said at least one pair of ramming arms between a first position remote from the animal and a second position in which the pad carried the ramming arm engages a predetermined one of the two carcass portions of the animal.

2. The machine of claim 1, wherein the gripping and ramming chassis comprises a fixed upper part and of a vertically mobile lower part and the machine comprises a device for detecting the size of the animal that is adapted to control the displacement of the mobile lower part in order to allow application of the pads on the selected regions of the animal.

3. The machine of claim 1, wherein the bearing structure is mounted on the frame to be displaceable in a horizontal direction perpendicular to the direction of movement of the gripping and ramming chassis.

4. The machine of claim 1, wherein the bearing and centering structure is formed by two systems.

5. The machine of claim 1, wherein each ramming arm includes means for omnidirectional holding of a pad.

6. The machine of claim 5, wherein each pad is mounted on elastic return means and is provided with a protecting sleeve fixed to the ramming arm.

7. The machine of claim 6, wherein each pad comprises a marking face in the form of a cap or a stack of washers of pyramidal section whose dimension decreases from the base to the apex.

8. The machine of claim 5, wherein each pad comprises a marking face into which open out vents for evacuating vapour created during ramming.

9. The machine of claim 6, wherein each pad comprises a marking face into which open out vents for evacuating vapour created during ramming.

10. A process for applying pads on an animal employing a machine including a frame intended to be placed laterally with respect to a displacement direction of a conveyor from which the animal is suspended comprising:
    placing the machine laterally with respect to the direction of displacement of the conveyor,
    detecting the presence of a slaughtered animal suspended from the conveyor, at a given distance from the machine,
    displacing a gripping and ramming chassis of the machine transversely and in the direction of the conveyor, so that a bearing and centering structure engages between two half-carcasses of the animal,
    controlling the approach of at least one pair of presser arms with respect to the bearing structure in order to immobilize the animal,
    controlling relative approach of at least one pair of rammer arms with respect to the bearing structure, in order to ensure application of the pad on the animal's skin,
    controlling relative moving apart of the rammer arms and the presser arms with respect to the bearing structure,
    and disengaging the gripping and ramming chassis with respect to the conveyor.

11. The process of claim 10, wherein further comprising detecting the size of the animal and vertically positioning the at least one pair of rammer arms in dependence upon the detected size.

12. The process of claim 10, wherein, as soon as the presence of the animal is detected, the gripping and ramming chassis is displaced in a direction parallel to that of the conveyor and at a speed synchronized with the speed of the conveyor.

* * * * *